(12) United States Patent
Sonstroem

(10) Patent No.: US 6,862,147 B1
(45) Date of Patent: Mar. 1, 2005

(54) DECENTERED FIELD LENS WITH TILTED FOCAL PLANE ARRAY

(75) Inventor: Jamie Sonstroem, Springfield, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/690,668

(22) Filed: Oct. 23, 2003

(51) Int. Cl.⁷ .............................................. G02B 9/00
(52) U.S. Cl. ........................ 359/738; 359/619; 359/620
(58) Field of Search ................................ 359/619, 620, 359/628, 737, 738

(56) References Cited

U.S. PATENT DOCUMENTS 5,526,166 A * 6/1996 Genovese ................... 359/204
5,844,727 A * 12/1998 Partlo ......................... 359/628

2001/0050896 A1 * 12/2001 Hajjar et al. ........... 369/112.24

* cited by examiner

*Primary Examiner*—Huy Mai
(74) *Attorney, Agent, or Firm*—William H. Anderson; Arthur K. Samora

(57) ABSTRACT

An IR sensor device in accordance with the present invention includes an optical train, a focal plane array (FPA) for receiving incoming ray bundles that have passed through the optical train, and a decentered plano-convex field lens positioned therebetween the filed lens is decentered in that it is positioned so that the optical axis intersects the fields lens at an offset distance from the geometric center of the lens perimenter. When the field lens is positioned in this manner, optical ray bundles that pass through the field lens establish a revised image plane. To compensate for the revised image plane, the FPA is titled until the FPA is co-planar with the revised image plane. Any reflected optical ray bundles are refracted as they pass back through the field lens and directed away from the pupil, to prevent reflected optical ray bundles from entering the optical train and leaving the sensor as an IR retro-reflection during operation of the device.

19 Claims, 5 Drawing Sheets

US 6,862,147 B1

DECENTERED FIELD LENS WITH TILTED FOCAL PLANE ARRAY

GOVERNMENT INTEREST

The invention described herein may be manufactured, used, sold, imported, and/or licensed by or for the Government of the United States of America.

FIELD OF THE INVENTION

The present invention applies generally to imaging devices. More particularly, the present invention is useful as an IR imaging device that incorporates a decentered field lens in order to reduce the device reflectance as viewed from its exterior, which further reduces the resultant optical signature of the device during its operation.

BACKGROUND OF THE INVENTION

Infrared (IR) staring sensors are well known in the prior art for obtaining data in the IR spectrum. Typically, devices that use sensors include an optical train that is centered on an optical axis. The optical train receives the optical rays through an aperture, and then directs the incoming IR optical rays onto a focal plane array (FPA) for further processing and display by other components of the device. One of the disadvantages of these devices, however, is that during operation, a portion of the incoming IR radiation actually reflects off the focal plane array, passes back through the optical device and leaves the device through the aperture as an IR emission signal. This phenomenon is known as retro-reflectivity.

It is extremely desirable that the retro-reflectivity for the device be minimized. This is because a remote laser interrogator can use the retro-reflection to locate and even target the sensor and it associated weapons system (along with the operators nearby). Stated differently, it is desirable to minimize retro-reflectivity of the device, so that the IR staring sensor is undetectable during operation of the device.

In view of the above, it is an object of the present invention to provide an IR sensor with a decentered field lens for minimizes retro-reflectivity. Another object of the present invention to provide an IR sensor with a decentered field lens that minimizes retro-reflectivity via refraction of incoming IR optical rays. It is another object of the present invention to provide an IR sensor with a decentered field lens that minimizes retro-reflectivity over two or more distinct ranges of IR wavelengths. Another object of the present invention is to provide an IR sensor with a decentered lens that is made of a non-linear optical material to provide protection from laser damage. A further object of the present invention is to provide an IR sensor that cannot be detected with a remote sensor during its operation. Another object of the present invention is to provide an IR sensor that is relatively easy to manufacture in a cost-effective manner.

SUMMARY OF THE INVENTION

An improved IR imaging device in accordance with the present invention includes an optical train and a pupil/cold stop for receiving incoming optical ray bundles, and a focal plane array (FPA) for receiving and processing the incoming ray bundles. The device of the present invention further includes a decentered field lens that is positioned between the optical train and the FPA. The location of the field lens ensures that before the incoming optical ray bundles impinge on the FPA, the optical ray bundles first pass through the field lens. The decentered field lens refracts the optical rays in a manner that ensures that any optical rays that reflect off the FPA do not re-enter the optical train and leave the device as an IR retro-reflectance.

The field lens is shaped with a convex surface and an opposing planar surface, and the field lens has a circular perimeter has a geometric center when observed in plan view. The optical train defines an optical axis for the sensor, and the circular field lens is positioned in the sensor so that the convex surface is facing the FPA, and so that optical rays are incident on the planar surface. In order to ensure that all ray bundles meet the FPA at the same angle, the focal length of the field lens is made equal to the distance from the powered lens surface (usually the convex surface) to the pupil/cold stop. The circular field lens is also positioned so that the optical axis intersects the field lens at a point that is spaced-apart from the geometric center of the lens perimeter.

The above configuration describes a plano-convex field lens with a circular perimeter. Since space is always at a premium within an IR sensor enclosure, and because in the above configuration over three quarters of the circular field lens is not actually used, an alternative embodiment exists where the unused portions of the field lens are removed prior to placement of the field lens within the sensor. To do this, the circular field lens is preferably cut into four quarter-circle sections; with each quarter-circle sections have two equal, perpendicular straight edges and a curved edge. The curved edge of the quarter-circle section is further milled to establish a field lens with a rectangular perimeter (when viewed in top plan) having four corners.

Once the field lens is cut and milled as described above, it has a maximum thickness at one corner. Because one surface is planar and the opposing surface is convex, the field lens thickness decreases along a spherical curve from the maximum thickness at one corner to a lesser thickness at each adjacent corner, and further to a minimum thickness at the opposite corner. This field lens configuration requires less than one fourth of the space that a circular field lens requires, and provides the added advantage that the rectangular perimeter of the field lens matches the perimeter shape of the active FPA region.

BRIEF DESCRIPTION OF THE DRAWINGS

The novel features of this invention will be best understood from the accompanying drawings, taken in conjunction with the accompanying description, in which similar characters refer to similar parts, and in which.

WRITTEN DESCRIPTION OF THE PREFERRED EMBODIMENT

Figure 1A:
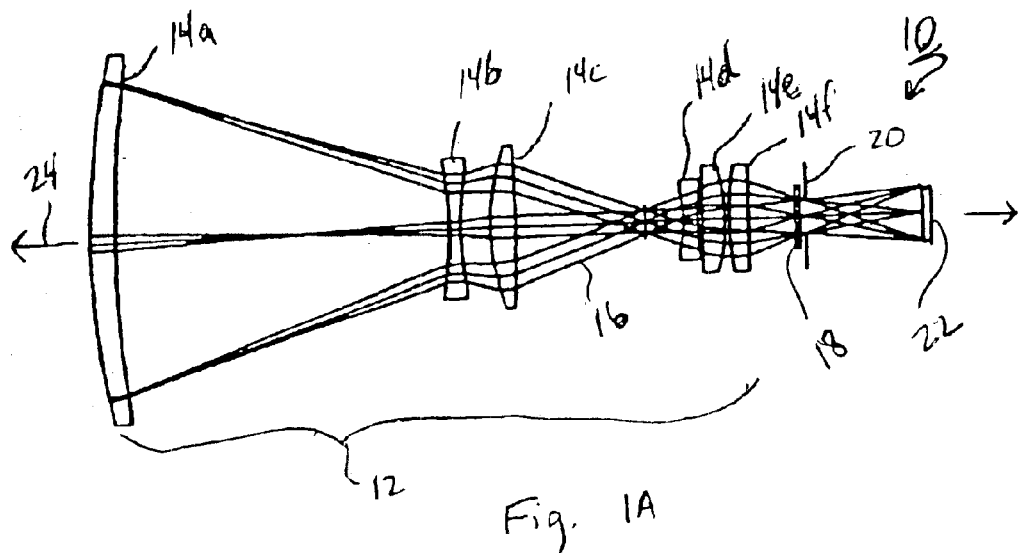
FIG. 1A is a schematic view of a staring sensor device that does not have a field lens installed.
Figure 1B:
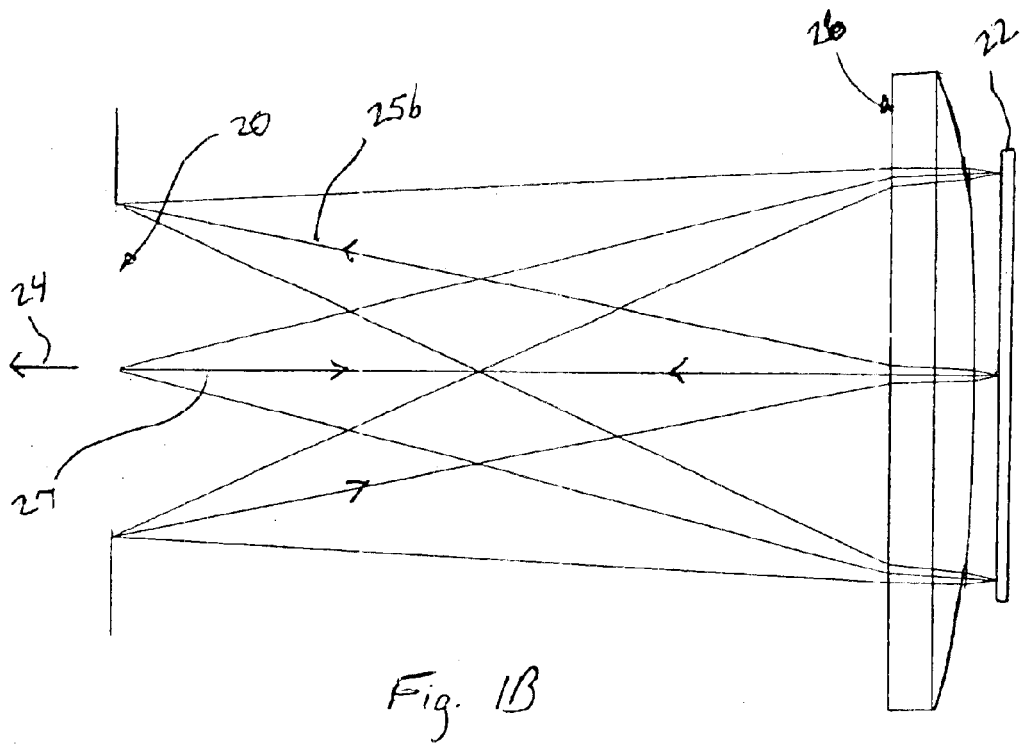
FIG. 1B is an enlarged view of the pupil/cold stop and FPA portions of the device of FIG. 1A, with a field lens further positioned therebetween.
Figure 2:
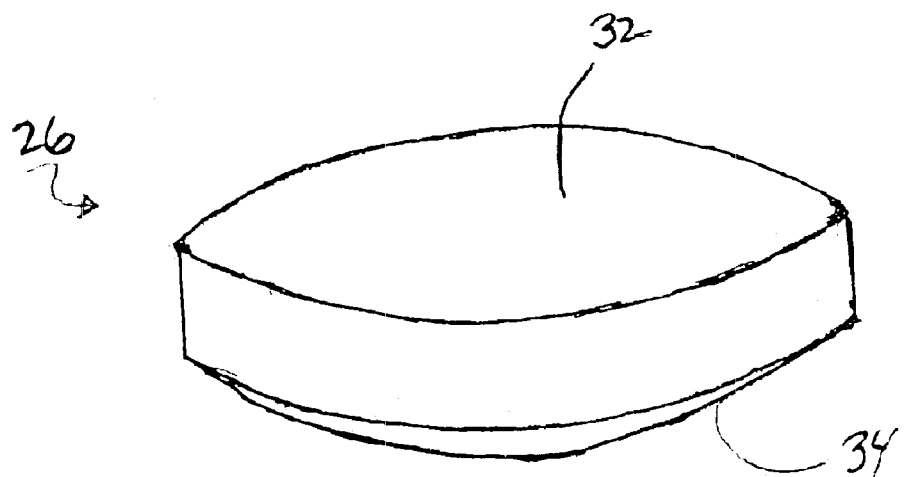
FIG. 2 is an isometric view of the field lens for the sensor of the present invention.

Referring now to the Figures, a typical infrared (IR) staring sensor device is shown and designated by reference character 10. As shown in FIGS. 1A and 1B, the device includes an optical train 12 that comprises a plurality of lenses 14a–14f. The lenses 14 focus and re-direct incoming optical ray bundles 16 of IR radiation through a dewar window 18. After passing through dewar window 18, the optical ray bundles pass through the sensor pupil/cold stop 20, and they are then directed onto a focal plane array (FPA) 22. The optical train 12 defines an optical axis 24, and the lenses, pupil and FPA are typically aligned so that they are centered on the optical axis, as shown in FIGS. 1A and 1B.

As the incoming optical ray bundles 16 impinge on the FPA, a plurality of pixels (not shown) receive the IR information for further processing and/or display by other components (not shown) of the IR sensor. In some sensor applications, and as shown in FIG. 1B, a field lens is positioned between the pupil/cold stop and FPA to focus the optical ray bundles onto the FPA.

Figure 3:
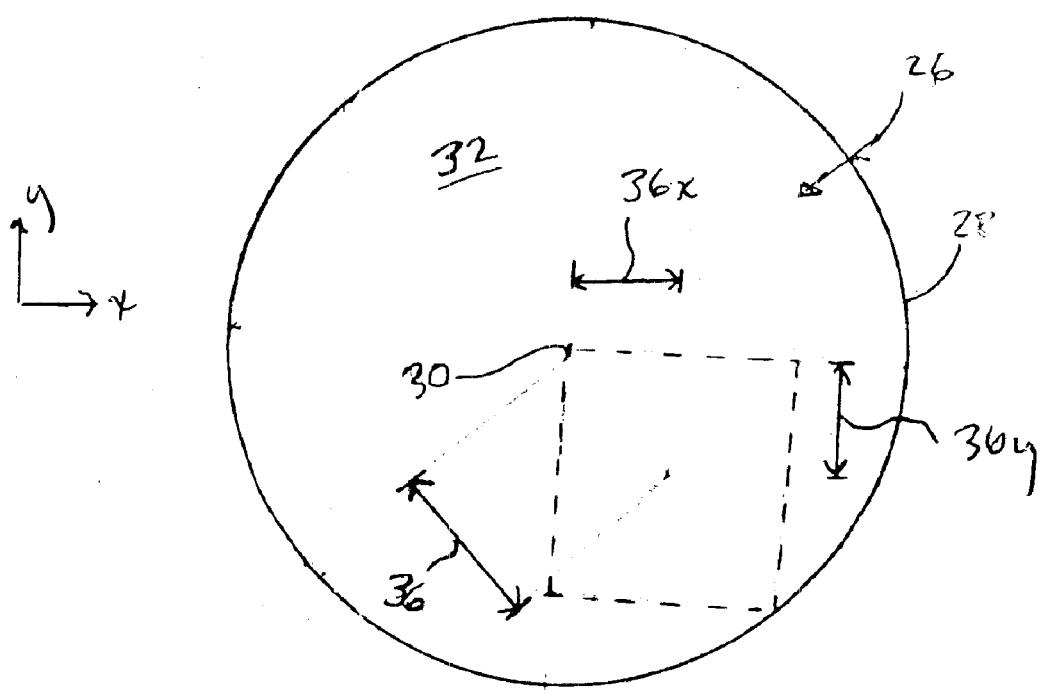
FIG. 3 is a plan view of the field lens of FIG. 2.
Figure 4:
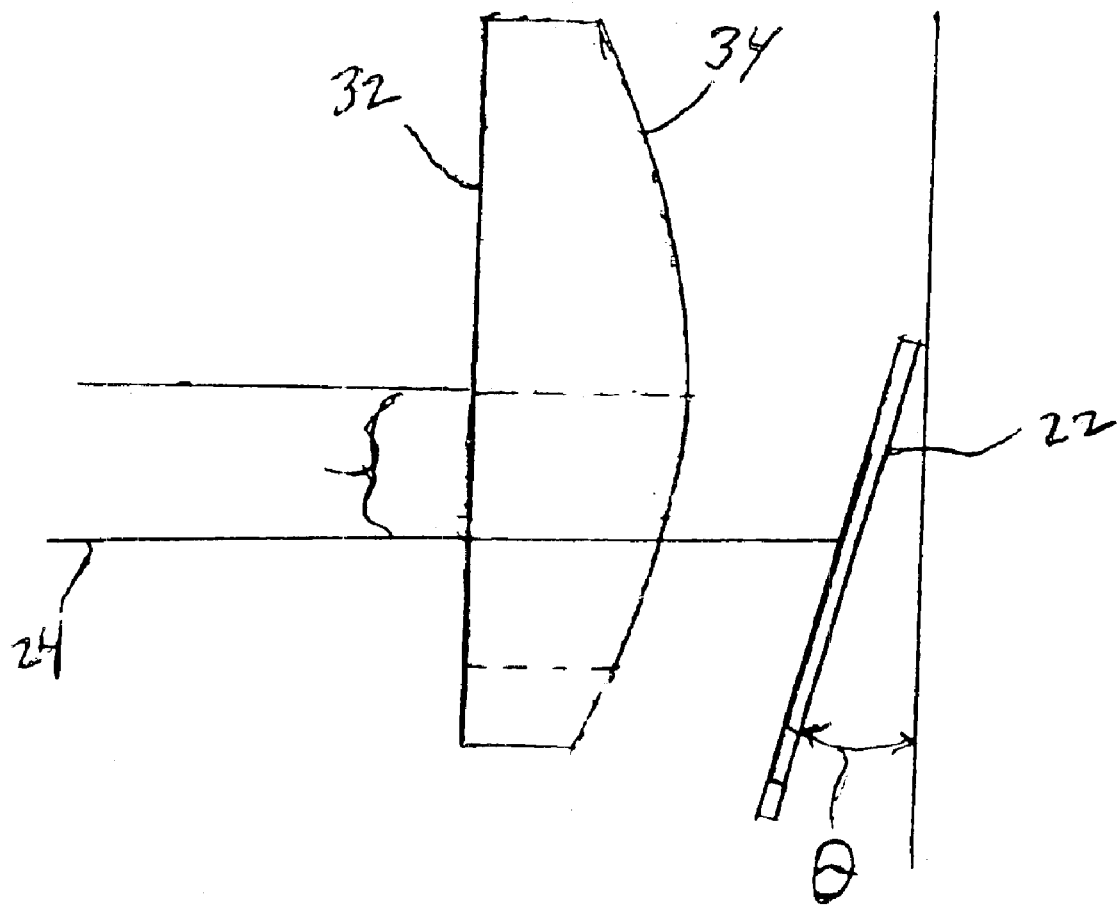
FIG. 4 is a side elevational view of the field lens and FPA shown in FIG. 2, when the field lens is decentered relative to the optical axis of the device.
Figure 5A:
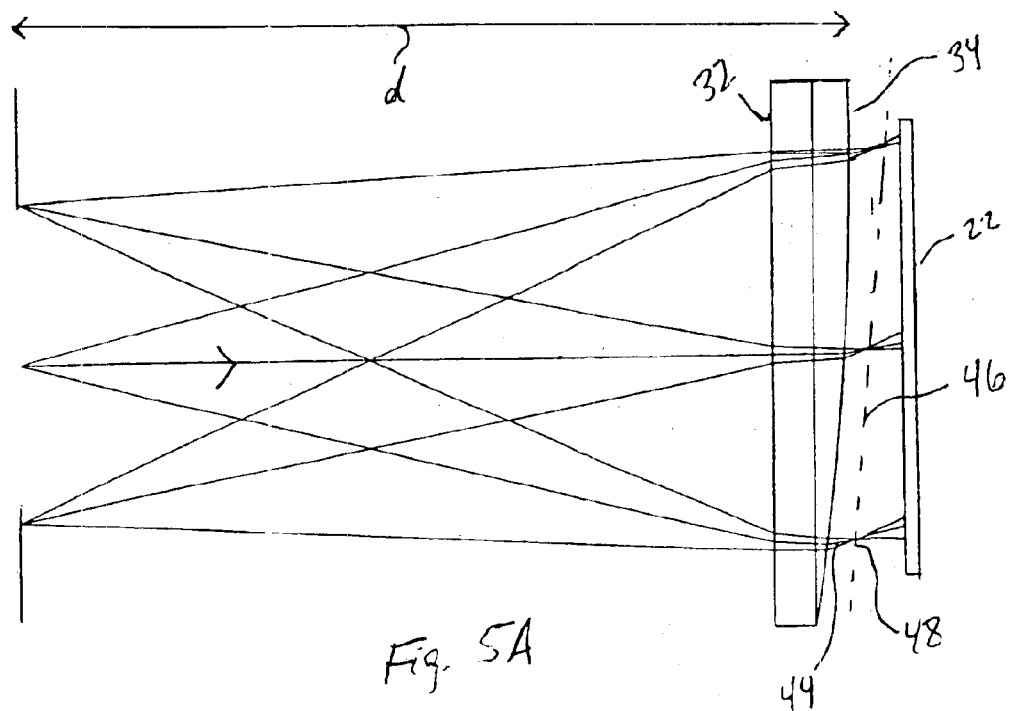
FIG. 5A is a birds-eye view of the field lens (when it is decentered) of the present invention during operation of the device, with the FPA aligned with the vertical (not tilted).
Figure 5B:
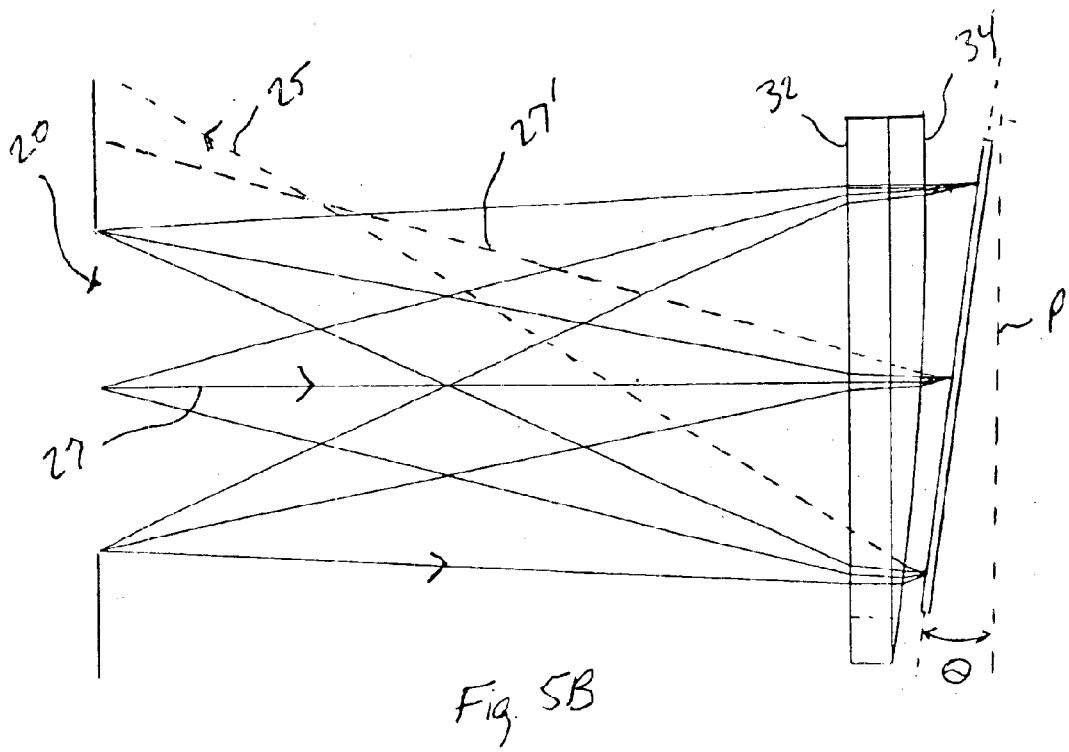
FIG. 5B is the same view as FIG. 4 during operation of the device, but with the FPA tilted.

After the FPA receives the optical ray bundles, other components of the sensor convert the data in the optical ray bundles into an IR image in a manner known in the art. However, some of the optical ray bundles actually reflect off the FPA during operation. The reflected ray bundles 25, of which reflected ray bundle 25b in FIG. 1B is representative, have the potential to pass back through the pupil and re-enter the optical train 12 in an outwardly bound direction. This is particularly true for the chief optical ray 27, and other optical rays that are very closely aligned with the optical axis 24. If this occurs, some of the reflected ray bundles may even leave the device as an infrared (IR) signal, or a retro-refletion In order to prevent reflected optical ray bundles from leaving the sensor as an IR emission, the structure and positioning of the field lens can be manipulated. Referring now primarily to FIGS. 2–5B, a field lens 26 for the sensor of the present invention is shown. The field lens has a circular perimeter 28 when observed in plan view, and the circular perimeter defines a geometric center 30 for the field lens, as shown in FIG. 3. The field lens is formed with a planar surface 32 and an opposing convex surface 34, as shown by FIGS. 2–5B. In FIG. 5B, the convex surface is spherical. There are other ways, however, to shape the convex and for some applications an aspherical surface for the lens might also be appropriate, according to the needs of the user.

For positioning within the device, and as shown in FIGS. 1B and 4–5B, the field lens is placed between the pupil 20 and the FPA 22. More specifically, field lens is positioned so that the distance d from the powered lens surface (convex surface 34) to pupil/cold stop 20. The field lens is further preferably oriented so that convex surface 34 faces the FPA and planar surface 32 faces the pupil. With this configuration, incoming ray bundles 24 that have passed through the optical train are incident on the planar surface 32 of the field lens. Also, the field lens must positioned proximate the FPA, in order to function as a field lens as know in the art.

In the preferred embodiment, the field lens is made of a non-linear optical material to provide the FPA with protection from laser damage. Additionally, planar surface 32 could be a diffractive surface, provide the focal length of the field lens is adjusted to cause behavior of the optical rays as more fully described below.

As best seen in FIGS. 3–5B, the field lens of the present invention is decentered. That is, the field lens is positioned so that the optical axis 24 intersects the field lens at an offset distance 36 (FIG. 3) from the geometric center 30 of the lens perimeter. The optical ray bundles that impinge on the field lens pass through the plano-convex field lens and are refracted. Because the lens is asymmetrical (decentered) with respect to the optical axis, the refracted ray bundles establish a plurality of "cones" 44 with revised image focal points 48 that establish a new image plane 46. To maintain focus of the IR "image" received, the FPA must be tilted until the FPA is co-planar with new image plane.

If the field lens is decentered in one dimension only from the geometric center thereof (for example, along the x-axis for an Cartesian coordinate system see distance 36x in FIG. 3), then the FPA need only be tilted in one plane. For example, decentering in one dimension only and tilting the FPA in one plane would be appropriate to maintain IR image focus in sensors that have "smooth" FPA's with non-reticulated pixels (not shown). However, if the field lens is decentered in two dimensions (i.e. along both the x-axis and the y-axis; distances 36x and 36y in FIG. 3), then the FPA must be tilted in two planes to ensure that the FPA is co-planar with the new image plane.

As the ray bundles impinge on the FPA, some of the ray bundles are reflected back towards the field lens. As the reflected ray bundles 25 pass through the field lens, they are again refracted. However, because of the above-described structure and position of the field lens and the tilt of the FPA, the reflected ray bundles 25 are directed away from the pupil/cold stop 20, so that they do not pass therethrough, as perhaps best seen in FIG. 5B. This is true even for the chief optical ray, or the optical ray that is coincident with the optical axis for the device, as depicted reflected optical ray 27' in FIG. 5B. To ensure the reflected ray bundles 25 behave in this manner, the lens must be sufficiently decentered (in combination with a minor tilt of the FPA to compensate for image plane tilt as described above) that the chief ray meets the FPA an angle sufficient to obtain an angle of reflection θ which causes the reflected optical rays not to re-enter the pupil/cold stop. In the preferred embodiment, the angle θ is greater than $\tan^{-1}(1/(2*F\#))$, where F# is the F-number of the host sensor. The FPA must be tilted by the same minimum angle θ from the vertical plane P, where θ is as defined above (for the case where the FPA is tilted in two planes).

Figure 6:
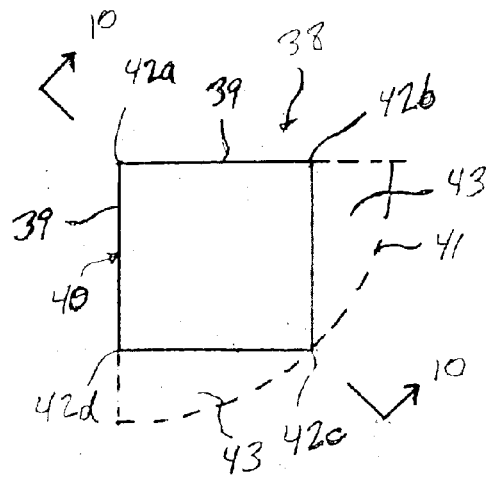
FIG. 6 is a plan view of an alternative embodiment of the field lens of FIG. 2.

In an alternative embodiment of the invention, and referring now to FIGS. 6–10, the circular planoconvex field lens shown in FIGS. 2–5 can be cut, first into halves, then into quarter-circle sections 38, as shown in FIG. 6 (only one quarter-circle section 38 is shown). Each quarter-circle section 38 has perpendicular side edges 39, 39 of equal edge length and a quarter-circle curved edge 41 as shown in FIG. 6. The arched portions 43,43 of the quarter-circle section 38 (shown in phantom in FIG. 6), can then be milled to yield a field lens with a rectangular perimeter 40 with four respective corners 42a–42d when observed in plan view (FIG. 6). With this configuration, the rectangular field lens saves space within the sensor (note that with the circular field lens embodiment shown in FIGS. 2–5, over three quarters of the lens is not used). This allows for manufacture of more compact IR sensors and provides the added advantage of having the same general shape the active area of a typical FPA.

Figure 8:
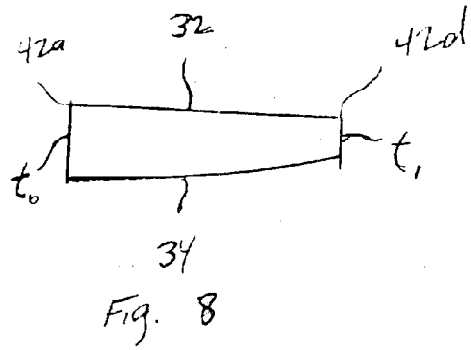
FIG. 8 is a cross-sectional view taken along line 8—8 in FIG. 7.
Figure 9:
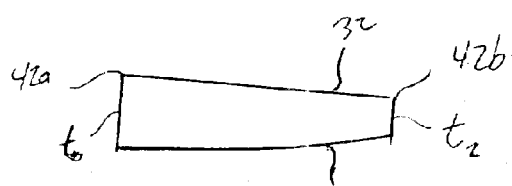
FIG. 9 is a cross-sectional view taken along line 9—9 in FIG. 7.
Figure 7:
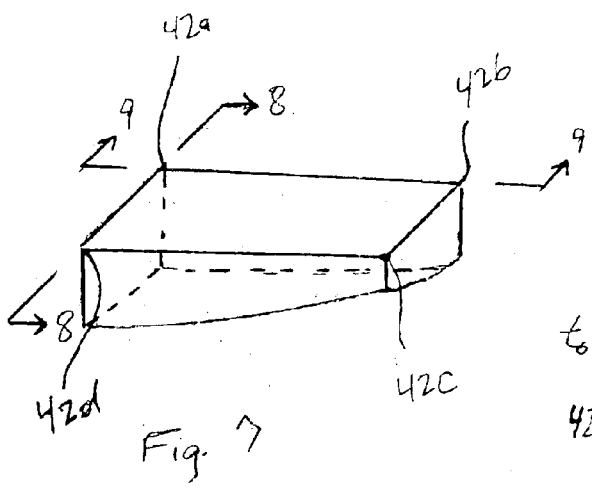
FIG. 7 is an isometric view of the field lens of FIG. 6.
Figure 10:
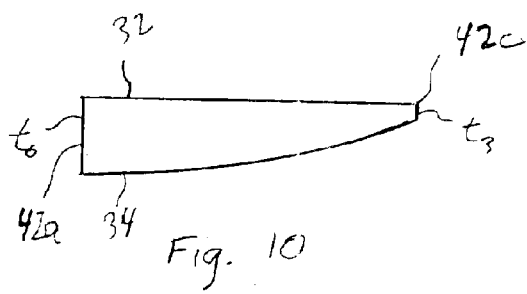
FIG. 10 is a cross-sectional view taken along line 10—10 in FIG. 6.

As shown by FIGS. 7–10, the result is a rectangular field lens that has a maximum thickness $t_0$ at corner 42a. Proceeding from corner 42a to corner 42d, the lens thickness decreases in a spherical fashion (which is equal to the radius of curvature of the lens) to a lesser intermediate thickness $t_1$ at 42d, as shown in FIG. 8. Proceeding from corner 42a to 42b, and as shown in FIG. 9, the field lens thickness decreases from 42a to 42b in the same spherical manner from maximum thickness $t_0$ to lesser intermediate $t_2$. The intermediate thickness $t_2$ at corner 42d is equal to intermediate thickness $t_1$ at corner 42b. When proceeding from corner 42a to corner 42c (FIG. 10), the field lens thickness decreases from maximum thickness $t_0$ at corner 42a to a minimum thickness $t_3$ at corner 42c, with thickness $t_3$ being the minimum thickness overall for the rectangular field lens During operation, and referring back to FIGS. 4–5B (the rectangular field lens is shown in phantom in FIG. 4), the rectangular field lens is aligned so that optical axis 24 passes through the center of the rectangular perimeter. Incoming optical ray bundles that have passed through the pupil enter the field lens. As the ray bundles pass therethrough, they are refracted and leave the field lens at a uniforrn tilt angle. As described above, the FPA is tilted from the vertical and horizontal by angle θ. The optical ray bundles, after leaving the field lens, impinge on the tilted FPA. Any incident IR ray bundles that might reflect off the FPA are "captured" by the decentered field lens and refracted so that the reflected optical ray bundles are directed away from the pupil (See FIG. 5). Since the reflected ray bundles do not re-enter the optical train, they do not leave the sensor as an IR retro-reflection.

While the IR sensor incorporating a decentered field lens of the present invention (as herein shown and disclosed in detail) is fully capable of obtaining the objects and providing the advantages above stated, it is to be understood that the presently preferred embodiments are merely illustrative of the invention. As such, no limitations are intended other than as defined in the appended claims.

What is claimed is:

1. An imaging device comprising:
    an optical train for receiving optical ray bundles, said optical train defining an optical axis;
    a focal plane array arranged for detecting said optical ray bundles;
    a field lens positioned between said optical train and said focal plane array, said field lens having a planar surface, an opposing convex surface and a lens perimeter that defines a geometric center;
    said lens perimeter having at least one straight edge and one curved edge; and,
    said field being decentered with said device so that said optical axis intersects said field lens at an offset distance from said geometric center.

2. The device of claim 1 wherein said lens perimeter has two straight edges and a curved edge.

3. The device of claim 2 wherein said wherein said straight edges are perpendicular and have an equal edge length.

4. The device of claim 1 wherein said field lens has a planar surface that is normal to said optical axis and an opposing convex surface that faces said focal plane array.

5. The device of claim 4 wherein said focal plane array is tilted so that said optical ray bundles, after passing through said field lens, impinge on said focal plane array at a constant incidence angle.

6. The device of claim 5 wherein said field lens is made of non-linear optical material.

7. An imaging apparatus comprising:
    an optical train for receiving optical ray bundles, said optical train defining an optical axis;
    a focal plane array arranged for detecting said optical ray bundles;
    a field lens positioned between said optical train and said focal plane array so that said optical ray bundles pass therethrough;
    said field lens having a rectangular lens perimeter with four lens corriers; and,
    said field lens having a lens thickness measured from said planar surface to said convex surface, said lens thickness having a spherical decrease from a maximum thickness at one of said corners to a lesser thickness at each respective remaining corner.

8. The apparatus of claim 7 wherein said field lens has planar surface normal to said optical axis and an opposing convex surface that faces said focal plane array.

9. The apparatus of claim 8 wherein said field lens is positioned so that said rectangular perimeter is centered on said optical axis.

10. The apparatus of claim 7 wherein said field lens is made of a non-linear optical material 11. An imaging device comprising:
    an optical train for receiving optical ray bundles, said optical train defining an optical axis;
    a focal plane array for detecting said optical ray bundles;
    a circular field lens positioned between said optical train and said focal plane array, said field lens having a geometric center when viewed in top plan; and,
    said circular field lens aligned on said optical axis so that said optical axis intersects said field lens at an offset distance from said geometric center.

12. The device of claim 11 wherein said circular field lens has a planar incident surface and an opposing convex surface, said incident surface normal to said optical axis, said convex surface facing said focal plane array.

13. The device of claim 11 wherein said field lens of made of a non-linear optical material.

14. The device of claim 11 wherein said field lens has opposing convex surfaces.

15. A method for minimizing retro-reflection from an imaging device comprising the steps of:
    (A) receiving optical ray bundles through an optical train that defines an optical axis;
    (B) arranging a focal plane array in a manner that allows said optical ray bundles to impinge on said focal plane array;
    (C) affording a field lens having a geometric center when viewed in top plan; and,
    (D) positioning said field lens between said optical train and said focal plane array so that said field lens is decentered and said optical axis intersects said field lens at an offset distance from said geometric center.

16. The method of claim 15 wherein said field lens is circular and further comprising the step of:
    (E) removing a portion of said field lens to establish a quarter-circle section; having perpendicular straight edges of equal length and a third arcuate edge; and,
    (F) milling said arcuate edge to establish a rectangular field lens having a rectangular perimeter when observed in plan view, said rectangular field lens;
    (G) reestablishing a geometric center for said rectangular field lens; and, (H) accomplishing step (D) so that said optical axis passes through said geometric center, step (H) being performed after step (G).

17. The method of claim 16 wherein said step (C) further comprises the step of:
(I) shaping said field lens with a planar incident surface and an opposing convex surface.

18. The method of claim 17 wherein said step D) is accomplished so that said optical ray bundles are incident on said planar incident surface and said convex surface faces said focal plane array.

19. The method of claim 18 wherein said step D) establishes a revised image plane that intersects a plane containing the focal plane array, and further comprising the step of:
(J) tilting said focal plane array so that said-focal plane array is co-planar with said revised image plan to.

* * * * *